(12) United States Patent
Chhabra

(10) Patent No.: US 9,166,959 B2
(45) Date of Patent: Oct. 20, 2015

(54) SECURE COMMUNICATION USING PHYSICAL PROXIMITY

(75) Inventor: Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 13/977,160

(22) PCT Filed: Mar. 31, 2012

(86) PCT No.: PCT/US2012/031757
§ 371 (c)(1),
(2), (4) Date: Jun. 28, 2013

(87) PCT Pub. No.: WO2013/147911
PCT Pub. Date: Oct. 3, 2013

(65) Prior Publication Data
US 2014/0032896 A1   Jan. 30, 2014

(51) Int. Cl.
*H04L 9/16* (2006.01)
*G06F 21/36* (2013.01)
*G06K 9/18* (2006.01)
*H04L 29/06* (2006.01)
*H04W 12/02* (2009.01)

(52) U.S. Cl.
CPC ............ *H04L 63/0428* (2013.01); *G06F 21/36* (2013.01); *G06K 9/183* (2013.01); *H04L 9/16* (2013.01); *H04L 63/0492* (2013.01); *H04L 63/08* (2013.01); *H04W 12/02* (2013.01)

(58) Field of Classification Search
CPC ...... H04L 63/0428; H04L 63/08; G06F 21/36
See application file for complete search history.

(56) References Cited

U.S. PATENT DOCUMENTS

| 8,010,977 | B2 | 8/2011 | Hogyoku | |
|---|---|---|---|---|
| 2007/0215685 | A1* | 9/2007 | Self et al. | 235/375 |
| 2009/0031373 | A1* | 1/2009 | Hogyoku | 725/104 |
| 2010/0017860 | A1* | 1/2010 | Ishida | 726/7 |
| 2011/0231655 | A1* | 9/2011 | Bollay et al. | 713/153 |

OTHER PUBLICATIONS

International Search Report and Written Opinion received for PCT application No. PCT/US2012/031757, mailed on Nov. 23, 2012, 9 pages.
International Preliminary Report on Patentability received for PCT Application No. PCT/US2012/031757, mailed on Oct. 9, 2014, 6 pages.

\* cited by examiner

*Primary Examiner* — Minh Dinh
*Assistant Examiner* — Arya Golriz
(74) *Attorney, Agent, or Firm* — Jordan IP Law, LLC

(57) ABSTRACT

Systems and methods may provide for implementing a secure communication using physical proximity. In one example, the method may include transmitting an encrypted first communication including a sensitive information file, decrypting the encrypted first communication to generate a decrypted first communication including the sensitive information file, displaying the decrypted first communication, capturing a version of the decrypted first communication displayed on the intermediary device, and extracting the sensitive information file at a user device.

8 Claims, 2 Drawing Sheets

SECURE COMMUNICATION USING PHYSICAL PROXIMITY

BACKGROUND

1. Technical Field

Embodiments generally relate to secure communications. More particularly, embodiments relate to implementing a secure communication using physical proximity.

2. Discussion

Mobile device payment services may utilize a received confidential communication, such as a quick response (QR) code, to enhance security. A QR code may contain information necessary for the mobile device to complete a transaction, which may be extracted by scanning the code with, for example, a camera device.

However, one disadvantage to using a QR code may be that there is no assurance that its use will be limited to the intended user. For example, malware running on the computer device may capture a screenshot of the QR code, thereby allowing its use by "bad actors" located remotely.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
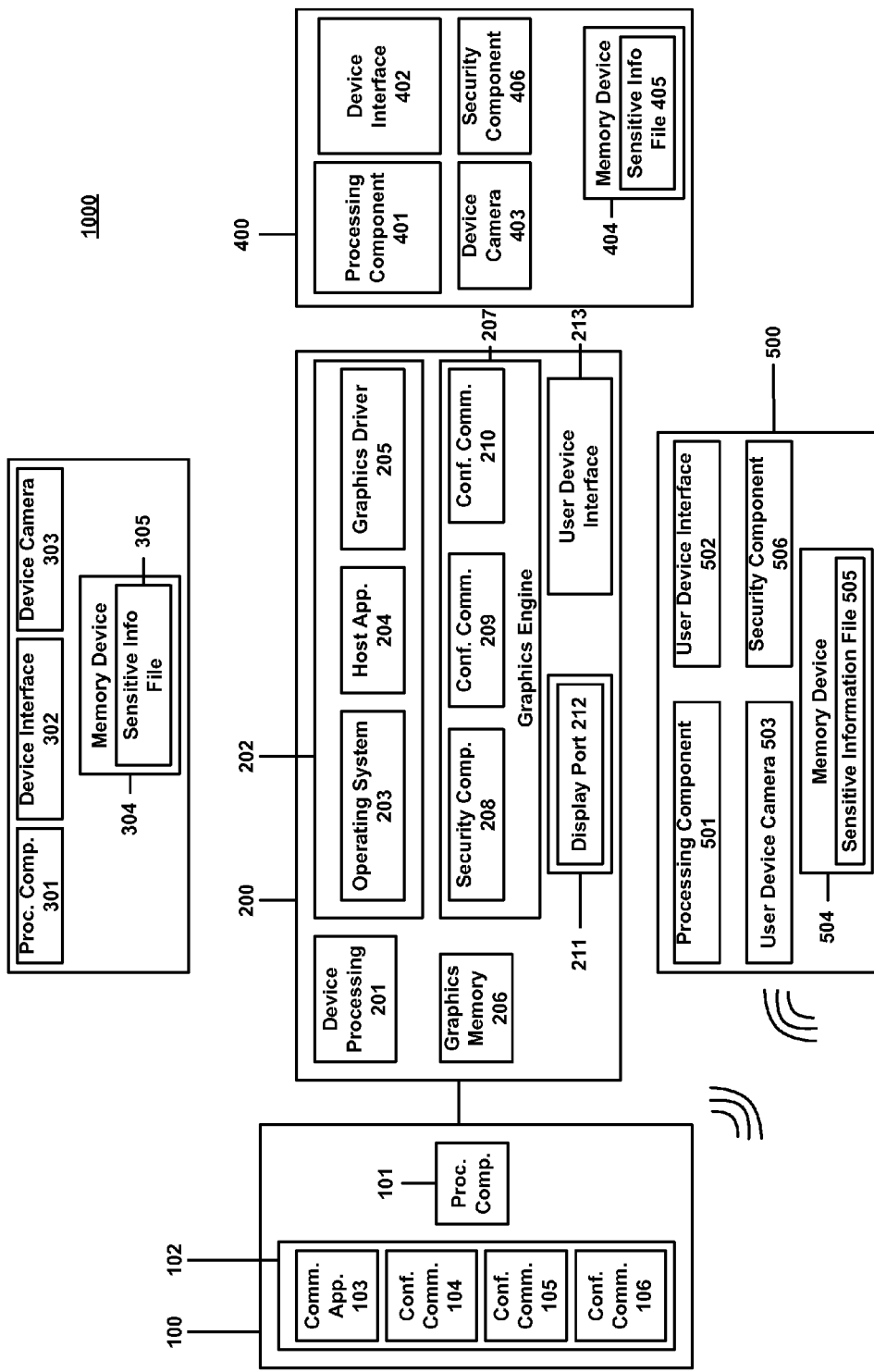
FIG. 1 is a block diagram of an example of a computing system to implement a secure communication using physical proximity in accordance with an embodiment of the invention.

Turning now to FIG. 1, a block diagram of a computer system 1000 to implement secure communication using physical proximity is shown. The computer system 1000 may include a transmitting device 100, an intermediary device 200, a first user device 300, a second user device 400, and a third user device 500. As will he discussed in greater detail, a merchant utilizing the transmitting device 100 may transmit a first, a second, and a third confidential communications to the intermediary device 200 for use by a first user using the first user device 300, a second user using the second user device 400, and a third user using the third user device 500, respectively.

The transmitting device 100, the intermediary device 200, the first user device 300, the second user device 400, and the third user device 500 may be any programmable machine that may carry out a sequence of logical operations and store data. Examples of these devices may include, for example, a laptop, desktop, personal digital assistant (PDA), media player, a mobile Internet device (MID), any smart device such as a smart phone, smart tablet, smart TV, or the like. In this example, the transmitting device 100 may he a computer server system and the intermediary device 200 may be a desktop computer. In addition, the first user device 300 and the second user device 400 may be smart phones, and the third user device 500 may be a tablet device.

The transmitting device 100, the intermediary device 200, the first user device 300, the second user device 400, and the third user device 500 may configured to communicate via various communication protocols. For example, any of these devices may be configured to communicate via a wired connection. For example, in this example, the transmitting device 100 may communicate with the intermediary device 200 via a wired Ethernet connection (e.g., IEEE 802.3-2005, LAN/MAN CSMA/CD Access Method). In other embodiments, any of these devices may communicate via other wired data connections (e.g., RS-232 (Electronic Industries Alliance/EIA), power line communication (e.g., X10, IEEE P1675), or USB (e.g., Universal Serial Bus 2.0 Specification)), etc., depending upon the circumstances.

Any of these devices may he configured to communicate via wireless communication protocols as well. In this example, the intermediary device 200 and the first user device 300, the second user device 400, and the third user device 500 may communicate wirelessly via near-field communication protocol. Also, the transmitting device 100 may communicate wirelessly via a wireless data connection (e.g., IEEE 802.11, 1999 Edition, LAN/MAN Wireless LANS (Wi-Fi)). In other embodiments of the present invention, these devices may communicate via Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), IEEE 802.16-2004, LAN/MAN Broadband Wireless LANS (WiMAX), etc.

Turning now to the transmitting, device 100, in this example, the transmitting device 100 may include a transmitting device processing component 101 and transmitting device memory component 102. As discussed, in this example, the transmitting device 100 may be a computer server system.

The transmitting device processing component 101 may include at least one computer processor that may he utilized to execute computer-readable executable instructions. The transmitting device processing component 101 may be configured to execute various software applications relating to transmitting a secure communication using physical proximity.

The transmitting device memory component 142 may be any device configured to store data. In this case, the transmitting device memory component 102 may store, among other things, a confidential communication application 103, a first confidential communication 104 for transmission to the first user in a first user communication, a second confidential communication 105 for transmission to the second user in a second user communication, and third confidential communication 106 for transmission to the third user in a third user communication.

The first confidential communication 104 may be encrypted, and may include, among other things, a first confidential communication pattern code (e.g., a QR code), a first confidential communication encryption key, and a first confidential communication password for use by the user of the first user device 300. Similarly, the second confidential communication 105 may be encrypted, and may include, among other things, a second confidential communication pattern code, a second confidential communication encryption key, and a second confidential communication password for use by the user of the second user device 400. The third confidential communication 106 may be encrypted, and may include, among other things, a third confidential communication pattern code, an third confidential communication encryption key, and a third confidential communication uniform resource locator (URL) for use by the user of the third user device 500, wherein the URL may be used to access data located on the transmitting device 100.

Turning now to the intermediary device 200, as discussed above, the intermediary device 200 may be a desktop computer in this example. The intermediary device 200 may include an intermediary device processing component 201, an intermediary device memory component 202, an intermediary device graphics memory component 206, intermediary device graphics engine component 207, an intermediary device display engine 211, and an intermediary device interface 213.

The intermediary device processing component 201 may include at least one computer processor that may be utilized to execute computer-readable executable instructions. For example, the user device processing component 101 may be configured to execute various software applications relating to implementing a secure communication using physical proximity.

The intermediary device memory component 202 may be any device configured to store data. In this case, the intermediary device memory component 202 may store, among other things, an intermediary device operating system 203, an intermediary device host application 204, and an intermediary device graphics driver 205.

The intermediary device operating system 203 may be configured to, among other things, manage computer hardware resources and service software applications on the intermediary device 200. The intermediary device host application 204 may be an software application configured to implement secure communications using physical proximity. The intermediary device graphics driver 205 may serve as an interface between software applications (e.g., the intermediary device host application 204) and hardware components (e.g., the intermediary device graphics engine component 207) operating on the intermediary device 200.

The intermediary device graphics memory 206 may be a storage device configured to store data that may be primarily affiliated with the intermediary device graphics engine component 207. The intermediary device graphics engine component 207 may be a hardware component configured to perform graphics calculations independent of the intermediary device processing component 201. Examples of the intermediary device graphics engine component may include a microcontroller that includes a firmware component, an application-specific integrated circuit, a logic array, a field programmable gate array, or the like. In this example, the intermediary device graphics engine component may be as microcontroller including a firmware component.

The intermediary device graphics engine component 207 may include an intermediary device security component 208. The intermediary device security component 208 may be a component configured to, among other things, decrypt a tile and extract information from the file. For example, in this case, the intermediary device security component 208 may be configured to decrypt the first confidential communication 104 that may be sent from the transmitting device 100.

The intermediary device security component 208 may also be configured to generate a modified second confidential communication 209 and a modified third confidential communication 210. In particular, as will be discussed in greater detail the intermediary device security component 208 may be configured to receive the second confidential communication 105 from the transmitting device 100, decrypt the second confidential communication 105 using the encryption key included in second confidential communication 105, and generate the modified second confidential communication 209 for transmission to the second user device 400.

The modified second confidential communication 209 may include, among other things, a modified second confidential communication pattern code, a modified second confidential communication encryption key, and a modified second confidential communication password for use by the user of the second user device 400. The modified second confidential communication pattern code and the modified second confidential communication password may be may encrypted using the modified second confidential communication encryption key. The modified second confidential communication encryption key may be a modified from the encryption key included in the second confidential communication 105, or may be a different encryption key altogether.

Similarly, the intermediary device security component 208 may be configured to receive the third confidential communication 106 front the transmitting device 100, decrypt the third confidential communication 106 using the encryption key included in the third confidential communication 106, and generate the modified third confidential communication 210 for transmission to the third user device 500. The modified third confidential communication 210 may include, among other things, a modified third confidential communication pattern code, an modified third confidential communication encryption key, and a modified third confidential communication URL for use by the user of the third user device 500. The modified third confidential communication URL may be directed to the same location to access data located on the transmitting device 100 as the third confidential communication URL of the third confidential communication 106.

The modified third confidential communication pattern code and the modified third confidential communication URL may be may encrypted using the modified third confidential communication encryption key. The modified third confidential communication encryption key may be modified from the encryption key included in the third confidential communication 106, or may be a different encryption key altogether.

The intermediary device display hardware engine 211 may hardware component configured to perform display tasks independently of a computer's main processor. The intermediary device display hardware engine 211 may include a display port 212. The intermediary device interface 213 may be a component configured to allow a user to interact with the user device 200. For example, in this embodiment, the user device interface 213 may be a desktop monitor including a graphical user interface (GUI). As will be discussed in greater detail, the intermediary device display hardware engine 211 may be configured to display, on the intermediary device interface 213, the first confidential communication 104 (i.e., in its decrypted form) for access by the first user, the modified second confidential communication 208 for access by the second user, and the modified third confidential communication 209 for access by the third user.

Turning now to the first user device 300, in this example, as discussed above, the first user device 300 may be a smart phone. The first user device 300 may include a first user device processing component 301, a first user device interface 302, a first user device camera 303, and a first user device memory component 304.

The first user device processing component 301 may include at least one computer processor that may be utilized to execute computer-readable executable instructions. For example, the first user device processing component 301 may be configured to execute various software applications relating to implementing a secure communication using physical proximity.

The first user device interface 302 may be a component configured to allow a user to interact with the user device 300. For example, in this embodiment, the user device interface 302 may be a smart phone display screen including a graphical user interface (GUI).

The first user device camera 303 may be any device configured to capture an image or a video feed of an object or image. For example, the first user device camera 303 may be configured to capture a version (e.g., an image) of the first confidential communication 104 displayed on the intermediary device monitor 213.

The first user device memory device 304 may be any device configured to store data. In this case, the first user memory device 304 may store, among other things, a first user device sensitive information file 305. The first user device sensitive information file 305 may be an version of the first confidential communication 104 (e.g., an image file taken by the first user device camera 303), and may be utilized to generate, among other things, the first confidential communication password included in the first confidential communication 104.

Turning now to the second user device 400, in this example, as discussed above, the second user device 400 may be a smart phone. The second user device 400 may include a second user device processing component 401, a second user device interface 402, a second user device camera 403, a second user device memory component 404, and a second user device security component 406.

The second user device processing component 401 may include at least one computer processor that may be utilized to execute computer-readable executable instructions. For example, the second user device processing component 401 may be configured to execute various software applications relating to implementing a secure communication using physical proximity.

The second user device interface 402 may be a component configured to allow a user to interact with the user device 400. For example, in this embodiment, the user device interface 402 may be a smart phone display screen including a graphical user interface (GUI).

The second user device camera 403 may be any device configured to capture an image or a video feed of an object or image. For example, the second user device camera 404 may be configured to capture a version (e.g., an image) of the modified second confidential communication 209 displayed on the intermediary device monitor 213.

The second user device memory device 404 may be any device configured to store data. In this case, the second user memory device 404 may store, among other things, a second user device sensitive information file 405. In this example, the second user device sensitive information file 405 may be a version of the modified second confidential communication 209 (e.g., an image file taken by the first user device camera 403).

The second user device security component 406 may be a component configured to, among other things, decrypt a file and extract information from the second user device sensitive information file 405. For example, the second user device security component 406 may be configured to decrypt the second user device sensitive information file 405 (e.g., using the modified second confidential communication encryption key included in the modified second confidential communication 209) to extract, among other things, the modified second confidential communication password included in the modified second confidential communication 209. The modified second confidential communication encryption key included in the modified second confidential communication 209 may also be utilized for pairing purposes in future transactions. Examples of the second user device security component 406 may include a microcontroller that includes a firmware component, an application-specific integrated circuit, a logic array, a field programmable gate array, or the like. In this example, the second user device security component 406 may be a firmware component.

Turning now to the third user device 500, in this example, as discussed above, the third user device 500 may be a tablet device. The third user device 500 may include a third user device processing component 501, a third user device interface 502, a third user device camera 503, a third user device memory component 505, and a third user device security component 506.

The third user device processing component 501 may include at least one computer processor that may be utilized to execute computer-readable executable instructions. For example, the third user device processing component 501 may be configured to execute various software applications relating to implementing a secure communication using physical proximity.

The third user device interface 502 may be a component configured to allow a user to interact with the user device 500. For example, in this embodiment, the user device interface 502 may be a tablet device display screen including a graphical user interface (GUI).

The third user device camera 503 may be any device configured to capture an image or a video feed of an object or image. For example, the third user device camera 505 may be configured to capture a version (e.g., an image) of the modified third confidential communication 210 displayed on the intermediary device monitor 213.

The third user device memory device 504 may be any device configured to store data. In this case, the third user memory device 504 may store, among other things, a third user device sensitive information file 505. In this example, the third user device sensitive information file 505 may be version of the modified third confidential communication 210 (e.g., an image file taken by the first user device camera 503).

The third user device security component 506 may be configured to, among other things, decrypt a file and extract information from the third user device sensitive information file 505. For example, in this embodiment, the third user device security component 506 may be configured to decrypt the third user device sensitive information file 505 (e.g., using the a modified third confidential communication encryption key in the modified this confidential communication 210) to extract, among other things, the modified third confidential communication URL included in the modified third confidential communication 210.

When the third user accesses the URL (e.g., using the third device interface 502), the third user device 500 may request the data of interest to the user located on the transmitting device 100 (e.g., using the wireless connection between the third user device 500 and the transmitting device 100). Upon receiving this request, the transmitting device 100 may (by receiving the request from the third user) recognize that a secure connection with the third user device 500, via the intermediary device 200, has been established.

Moreover, the modified third confidential communication encryption key included in the modified third confidential communication 210 may also be utilized for pairing purposes in future transactions. Examples of the third user device security component 506 may include a microcontroller that includes a firmware component, an application-specific integrated circuit, a logic array, a field programmable gate array, or the like. In this example, the third user device security component 506 may be an application-specific integrated circuit.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described in FIG. 1, the intermediary device security engine 208 may be built into the intermediary device graphics engine 207. However, this need not necessarily be the case. In other embodiments, the intermediary device security engine 208 may be coupled to the intermediary device graphics engine 207.

Also, in the embodiment described above, a user may utilize a user device, such as the first user device 300, that is separate from the intermediary device 200 to capture an image displayed on the intermediary device 200. However, in other embodiments, the intermediary device itself may include a camera device, which may be utilized to capture an image displayed on the intermediary device.

Figure 2:
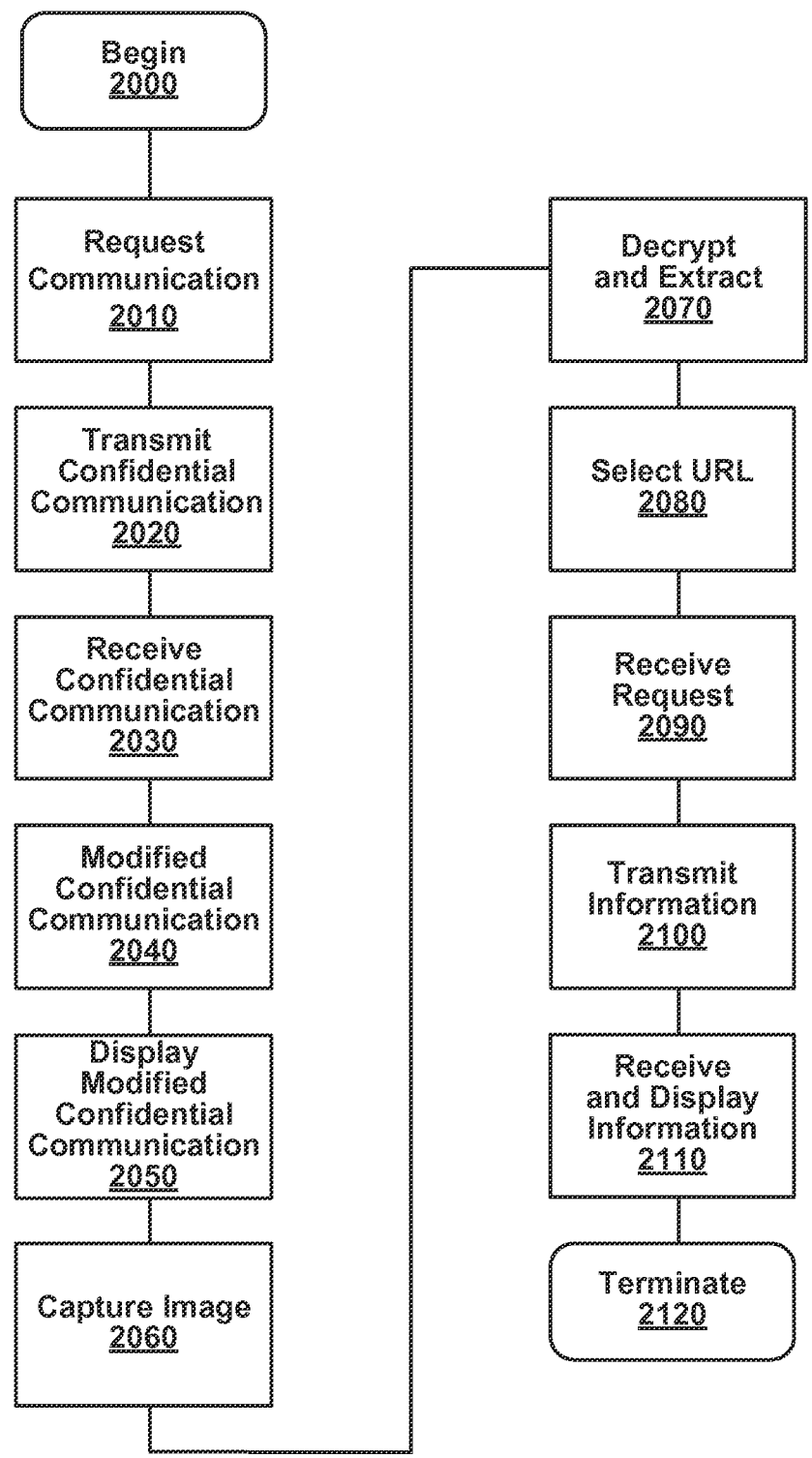
FIG. 2 is a flowchart of an example of a method of implementing a secure communication using physical proximity in accordance with an embodiment of the invention.

Turning now to FIG. 2, a flowchart of an example of a method of implementing secure communication using physical proximity in accordance with an embodiment of the invention is shown. In this example, a user, possessing a user device, such as the third user device 500 (FIG. 1), may utilize an intermediary device, such as the intermediary device 200 (FIG. 1.), to request a URL (relating to an information store of interest to the user) from a vendor utilizing a transmitting device 100, such as the transmitting device 100 (FIG. 1).

The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, the user may utilize the intermediary device to transmit a request communication to the transmitting device to provide a secure communication including an URL directed to an information store of sensitive information of interest to the user. At processing block 2020, the transmitting device may transmit a confidential communication, such as the third confidential communication 106 (FIG. 1). The confidential communication may include a confidential communication pattern, a confidential communication encryption key, and a URL directed to the information store of sensitive information of interest to the user. The confidential communication may be encrypted using, for example, the confidential communication encryption key.

At processing block 2030, the intermediary device may receive the confidential communication. In particular, the confidential communication may pass through, for example, an intermediary device memory component, such as the intermediary device memory component 202 (FIG. 1) and an intermediary device graphics memory, such as the intermediary device graphics memory 206 (FIG. 1). The confidential communication may remain encrypted.

At processing block 2040, the confidential communication may be forwarded to an intermediary device graphics engine component, such as the intermediary device graphics component 207 (FIG. 1), and further to an intermediary device security component, such as the intermediary device security component 208 (FIG. 1). The intermediary device security component may decrypt the confidential communication, and generate a modified confidential communication, such as the modified third confidential communication 210 (FIG. 1), including a modified confidential communication pattern, a modified confidential communication encryption key, and a modified confidential communication URL. The modified confidential communication may be encrypted. At processing block 2050, the intermediary device may display the encrypted modified confidential communication on an intermediary device interface, such as the intermediary device interface 213 (FIG. 1).

At processing block 2060, the user, who is proximately located to the intermediary device, may utilize a user device camera, such as the third user device camera 503 (FIG. 1), to capture an image file of the encrypted modified confidential communication, such as the third user device sensitive information file 505 (FIG. 1), displayed on the intermediary device interface. At processing block 2070, a user device security component, such as the third user device security component 506 (FIG. 1), may be utilized to decrypt and extract information from the image file of the encrypted modified confidential communication. More specifically, the user device security component may be configured to extract the modified confidential communication URL utilizing the modified code encryption key. Accordingly, a secure output configuration based on an end-to-end encrypted channel between the transmitting device, the intermediary device (i.e., the intermediary device security component), and the user device (i.e., the user device security component) may be implemented utilizing physical proximity.

At processing block 2080, the user may select the URL to retrieve the sensitive information of interest to the user located at the transmitting device. At processing 2090, upon receiving this request, the transmitting device may recognize that the request is from a user device that has received (and decrypted) a communication from the intermediary device, thereby indicating that the user device is a secure destination to transmit the information store of interest to the user. At processing block 2100, the transmitting device may transmit the information of interest to the user to the user device. At processing block 2110, an user device may receive the information of interest to the user, and may display it on the user device interface, such as the third user device interface 502 (FIG. 1) for the user. At processing block 2120, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 2, the user may utilize the intermediary device to request a confidential communication including, among other things, a URL directed to an information store of interest to the user. However, in other embodiments, this need not necessarily be the case. In other embodiments, the user may utilize the intermediary device to request, among other things, a password required for a secure transaction.

Embodiments may therefore provide a method of implementing a secure communication using physical proximity, comprising receiving an encrypted first communication, wherein the encrypted first communication includes a pattern code, a first encryption key, and a sensitive information file and decrypting the encrypted first communication to generate a decrypted first communication. The method may also include encrypting the decrypted first communication to generate a modified first communication, including a modified pattern code, a modified encryption key, and a modified sensitive information file and displaying the modified first communication.

In one example, the pattern code is a quick response code.

In one example, the sensitive information file is one or more of a password and a uniform resource locator.

In another example, upon generating the modified first communication, the modified first communication is transmitted for display.

In another example, the first encryption key is used to decrypt the encrypted first communication.

In still another example, the second encryption key is used to decrypt the modified first communication.

In yet another example, the method may include transmitting the encrypted first communication.

In yet another example, the method may provide for capturing a version of the modified first communication displayed, decrypting the version of the modified first communication displayed, and extracting the sensitive information file from the version of the modified first communication displayed.

Embodiments may also include at least one machine readable medium comprising a plurality of instructions that in response to being executed on a computing device, cause the computing device to carry out any of the examples of the aforementioned method. Embodiment may also provide an apparatus for implementing a secure communication using physical proximity comprising a processor and logic configured to perform any of the examples of the aforementioned method. Embodiments may provide a system for implementing a secure communication using physical proximity comprising a first device, a second device, and logic configured to perform any of the examples of the aforementioned method.

Still another embodiment may provide for a method of implementing a secure communication using physical proximity, comprising receiving an encrypted first communication, wherein the encrypted first communication includes a pattern code, a first encryption key, and a sensitive information file, decrypting the encrypted first communication to generate a decrypted first communication, including the pattern code, the first encryption key, and the sensitive information file, and displaying the decrypted first communication.

In one example, the pattern code is a quick response code.

In one example, the sensitive information file is one or more of a password and a uniform resource locator.

In still another example, upon generating the modified first communication, the modified first communication is transmitted for display.

In another example, the first encryption key is used to decrypt the encrypted first communication.

In another example, the method may include transmitting the encrypted first communication.

In another example, the method may include capturing a version of the version of the decrypted first communication displayed and extracting the sensitive information file from the version of the decrypted first communication displayed.

Embodiments may also include at least one machine readable medium comprising a plurality of instructions that in response to being executed on a computing device, cause the computing device to carry out any of the examples of the aforementioned method. Embodiment may also provide an apparatus for implementing a secure communication using physical proximity comprising a processor and logic configured to perform any of the examples of the aforementioned method. Embodiments may provide a system for implementing a secure communication using physical proximity comprising a first device, a second device, and logic configured to perform any of the examples of the aforementioned method.

Yet another embodiment may provide for a method comprising transmitting, using a transmitting device, an encrypted first communication, wherein the encrypted first communication includes a pattern code, a first encryption key, and a sensitive information file and receiving the encrypted first communication at an intermediary device including an intermediary device security component. The method may also provide for decrypting, using the intermediary device security component, the encrypted first communication to generate a decrypted first communication and encrypting, using the intermediary device security component, the decrypted first communication to generate a modified first communication including a modified pattern code, a modified encryption key, and a modified sensitive information file. The method may further provide for displaying, using the intermediary device, the modified first communication and capturing, using a user device located proximately to the intermediary device, a version of the modified first communication displayed on the intermediary device. In addition, the method may provide for decrypting, using a user device security component, the version of the modified first communication displayed on the intermediary device and extracting, at the user device, the sensitive information file from the version of the modified first communication displayed on the intermediary device.

Still another embodiment may provide for a method comprising transmitting, using a transmitting device, an encrypted first communication, wherein the encrypted first communication includes a pattern code, a first encryption key, and a sensitive information file and receiving the encrypted first communication at an intermediary device including an intermediary device security component. The method may also provide for decrypting, using the intermediary device security component, the encrypted first communication to generate a decrypted first communication, including the pattern code, the first encryption key, and the sensitive information file and displaying, using the intermediary device, the decrypted first communication. Also, the method may provide for capturing, using a user device located proximately to the intermediary device, a version of the decrypted first communication displayed on the intermediary device and extracting, at the user device, the sensitive information file from the version of the decrypted first communication displayed on the intermediary device.

Yet another embodiment may provide for at least one computer readable storage medium comprising a set of instructions which, if executed by a processor, cause a computer to transmit an encrypted first communication, wherein the encrypted first communication includes a pattern code, a first encryption key, and a sensitive information file and receive the encrypted first communication. The set of instructions, if executed by a processor, cause a computer to decrypt the encrypted first communication to generate a decrypted first communication, encrypt the decrypted first communication to generate a modified first communication, including a modified pattern code, a modified encryption key, and a modified sensitive information file, and display the modified first communication. The set of instructions, if executed by a processor, cause a computer to capture a version of the modified first communication displayed, decrypt the version of the modified first communication displayed, and extracting the sensitive information file from the version of the modified first communication displayed.

Another embodiment may provide for at least one computer readable storage medium comprising a set of instructions which, if executed by a processor, cause a computer to transmit an encrypted first communication, wherein the first communication includes a pattern code, a first encryption key, and a sensitive information file, receive the encrypted first communication, and decrypt the encrypted first communication to generate a decrypted first communication, including the pattern code, the first encryption key, and the sensitive information file. The set of instructions, if executed by a processor, cause a computer to display the decrypted first communication, capture a version of the version of the decrypted first communication displayed, and extract the sensitive information file from the version of the decrypted first communication displayed.

Another embodiment may provide an apparatus, comprising a processing component, a memory device, and a security component. The apparatus may include a receiving module to receive an encrypted first communication, wherein the encrypted first communication includes a pattern code, a first encryption key, and a sensitive information file and a decrypting module to decrypt the encrypted first communication to generate a decrypted first communication. The apparatus may also include an encrypting module to encrypt the decrypted first communication to generate a modified first communication, including a modified pattern code, a modified encryption key, and a modified sensitive information file and a displaying module to display the modified first communication.

Still another embodiment may provide a system including a first device and a second device. The first device may includes a first device processing component, a first device memory device, and a first device security component. The first device may also include a first device receiving module to receive an encrypted first communication, wherein the encrypted first communication includes a pattern code, a first encryption key, and a sensitive information file and a first device decrypting module to decrypt the encrypted first communication to generate a decrypted first communication. The first device may also include an first device encrypting module to encrypt the decrypted first communication to generate a modified first communication, including a modified pattern code, a modified encryption key, and a modified sensitive information file and a first device displaying module to display the modified first communication. The second device may include a second device processing component, a second device memory device, and a second device security component. The second device may also include a second device capturing module to capture a version of the modified first communication displayed, a second device decrypting module to decrypt the version of the modified first communication displayed, and a second device extracting module to extract the sensitive information file from the version of the modified first communication displayed.

Various embodiments may be implemented using hardware elements, software elements, or a combination of both. Examples of hardware elements may include processors, microprocessors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that turns such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method of implementing a secure communication using physical proximity, comprising:
    receiving a first confidential communication with an intermediary device, wherein the first confidential communication includes a confidential communication pattern, a confidential communication encryption key, and a sensitive information file;
    decrypting the first confidential communication to generate a decrypted first confidential communication;
    encrypting the decrypted first confidential communication to generate a modified first confidential communication, including a modified confidential communication pattern, a modified confidential communication encryption key, and a modified sensitive information file, wherein upon generating the modified first confidential communication, the modified first confidential communication is transmitted for display; and
    displaying the modified first confidential communication;
    capturing an image file of the modified first confidential communication with a user device in proximity to the intermediary device; and
    extracting the sensitive information file from the captured image file of the modified first confidential communication.

2. The method of claim 1, wherein the communication pattern is a quick response code.

3. The method of claim 1, wherein the sensitive information file is one or more of a password and a uniform resource locator.

4. The method of claim 1, wherein the capturing an image file of the modified first confidential communication with a user device in proximity to the intermediary device is performed with a user device camera.

5. The method of claim 1, wherein the sensitive information file is a uniform resource locator and the uniform resource locator is used to retrieve sensitive information from a transmitting device.

6. At least one non-transitory computer readable storage medium comprising a set of instructions which, when executed by a processor, cause a computer to:
    receive a first confidential communication, wherein the first confidential communication includes a confidential communication pattern, a confidential communication encryption key, and a sensitive information file;
    decrypt the first confidential communication to generate a decrypted first confidential communication;
    encrypt the decrypted first confidential communication to generate a modified first confidential communication, including a modified confidential communication pattern, a modified first confidential communication encryption key, and a modified sensitive information file, wherein upon generating the modified first communication, the modified first communication is to be transmitted for display; and display the modified first confidential communication in a format compatible with image capture by a user device.

7. The at least one non-transitory computer readable storage medium of claim 6, wherein the communication pattern is to be a quick response code.

8. The at least one non-transitory computer readable storage medium of claim 6, wherein the sensitive information file is to be one or more of a password and a uniform resource locator.

* * * * *